Dec. 9, 1924.
C. STEENSTRUP
METHOD OF MAKING CRANK SHAFTS
Filed Nov. 20, 1923
1,518,610
Fig. 1.
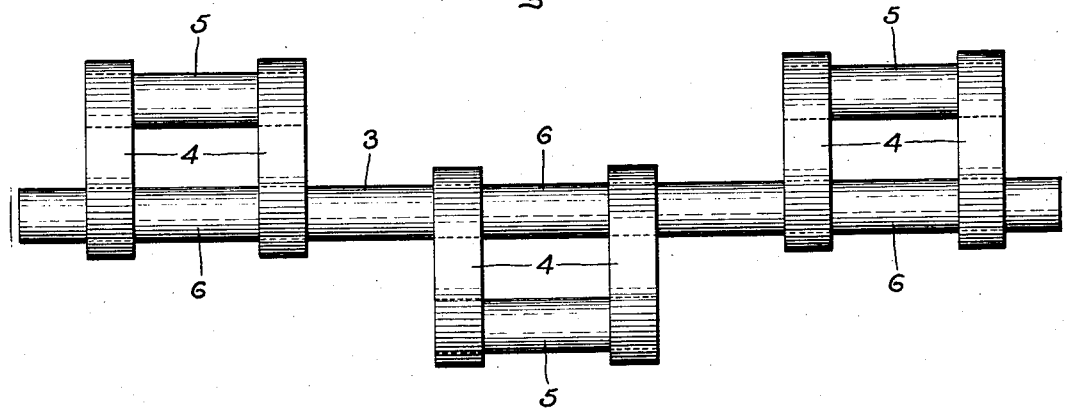
Fig. 2.
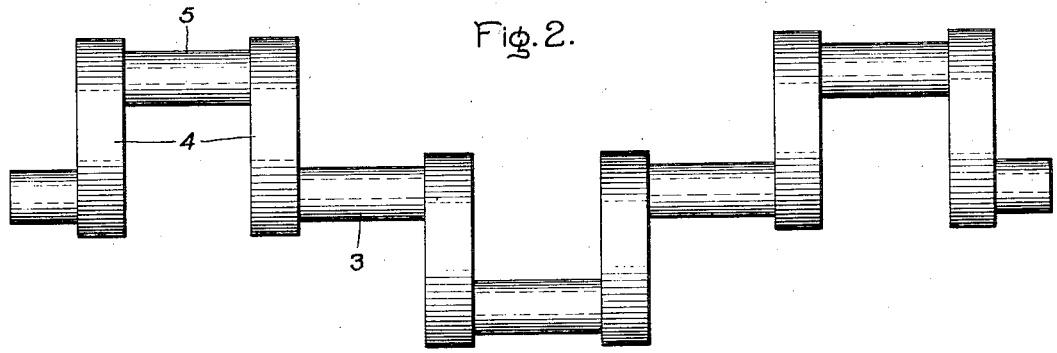
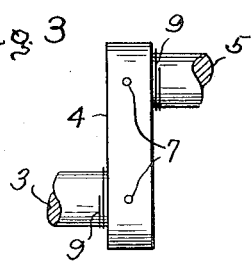
Fig. 3
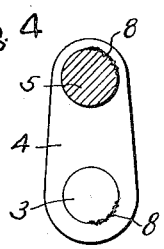
Fig. 4
Inventor:
Christian Steenstrup,
by
His Attorney.

Patented Dec. 9, 1924.

1,518,610

UNITED STATES PATENT OFFICE.

CHRISTIAN STEENSTRUP, OF SCHENECTADY, NEW YORK, ASSIGNOR TO GENERAL ELECTRIC COMPANY, A CORPORATION OF NEW YORK.

METHOD OF MAKING CRANK SHAFTS.

Application filed November 20, 1923. Serial No. 675,923.

*To all whom it may concern:*

Be it known that I, CHRISTIAN STEENSTRUP, a citizen of the United States, residing at Schenectady, in the county of Schenectady, State of New York, have invented certain new and useful Improvements in Methods of Making Crank Shafts, of which the following is a specification.

The present invention relates to crank shafts for reciprocating apparatus of various kinds, such for example as steam and internal combustion engines, air compressors, etc., and has for its object to improve and simplify the method of manufacturing the same.

For a consideration of what I believe to be novel and my invention, attention is directed to the accompanying description and the claims appended thereto.

In the attached drawing, Fig. 1 shows a partially completed crank shaft; Fig. 2 a completed shaft. Fig. 3 is a detail view of a portion of a crank shaft, and Fig. 4 is an end view of a crank and associated parts, showing means for temporarily holding them in their proper relation. For clearness of illustration, the crank pins and journals have been shown longer than customary.

In carrying out my invention, I first take a piece of suitable steel which may be obtained from the steel mills in the form of cylindrical rods or bars and finish it to the final or approximately final diameter and length of the finished shaft. Such a shaft is indicated at 3 and forms a straight, unbroken member. The next step is to separately form the cranks 4 and the crank or wrist pins 5 all of steel. By preference, the crank pins are also made of bar stock and after being finished are cut therefrom in suitable lengths. After the cranks are properly machined to the desired shape and size, holes are bored and reamed therein at their inner ends, of such size that when pushed or positioned one after the other on the shaft, the cranks will make a snug fit thereon. For the crank pins similar holes are bored and reamed in the outer ends of the cranks to receive them. The parts are then assembled on the shaft as shown in Fig. 1 with the cranks properly spaced thereon. The cranks may be assembled on the shaft in a number of different ways depending upon conditions. For large production of similar shafts it will be found preferable to heat all of the cranks and assemble them in pairs with the pins in place. While the cranks are still hot, or after they are reheated if necessary, they may be placed in a fixture side by side and properly spaced after which the cold shaft is pushed through from one end. As the cranks cool they shrink and are thus firmly seated on the shaft and the pins are also firmly shrunk in the cranks. On the other hand, for small production or where the shafts differ in size, etc., it will be desirable to assemble the cranks on the shaft one after the other or in pairs with the pins in place. By first heating the cranks to enlarge the shaft and pin openings all danger of scoring the shaft and pins or otherwise injuring them is avoided. The cranks may all lie in the same plane or one or more of the cranks may occupy different planes all of which are radial to the axis of the shaft. As shown there are three cranks but obviously a greater or lesser number may be provided depending upon the number of cylinders in the engine or other apparatus in which the shaft is used. By making all of the fits reasonably tight the cranks will retain their respective positions on the shaft without additional securing means during subsequent operations but if desired additional temporary fastening means may be used. For example, I may use small dowel pins 7 or I may use an oxy-acetylene torch to add sufficient molten metal to bond the parts as indicated at 8 in Fig. 4.

The shaft and associated parts when thus assembled is then placed in a suitable furnace and said parts united by the fusion of metal. For this purpose it is preferable to use a closed furnace in which hydrogen or equivalent gas is constantly maintained during the fusing operation. I have found that boronized copper is suitable for the purpose, also copper which has been treated long enough in a hydrogen furnace to drive off most if not all of the impurities. The joint between two pieces of steel united in this manner is greater in strength than either of the pieces. Repeated tests of such pieces in a testing machine show that when the parts are properly united the break will be in one of the pieces and not at the joint. The copper which is used in the fusing operation is applied before the shaft is put into the furnace and usually by wrapping some soft boronized or properly treated copper wire 9 around the parts and in close proximity to the joints. After the furnace is closed and hydrogen admitted the temperature is raised to a point above the melting temperature of the copper during which time the shaft parts are also raised to said temperature. When the proper temperature is reached, (and this may readily be observed through sight openings in the furnace,) the copper flows by capillary action through the joints between the shaft and cranks and through those between the cranks and crank pins with the result of fusing said parts into a unitary whole. After the fusing operation is completed the parts are removed from the furnace and permitted to cool. By preference the cooling operation is allowed to take place in a closed cooler or receptacle to which hydrogen is also admitted. After the parts of the shaft have been united they may and preferably are subjected to the usual heat treatment to increase their strength. Instead of allowing the shaft to be completely cooled after the fusing operation it may be taken while in a heated condition and subjected to said heat treatment and in this way an additional operation is avoided.

The next step is to cut away the parts of the shaft between each pair of cranks and in line with their pins as indicated at 6 which is a very simple machine operation. After this the shaft journals and crank pins may be ground or otherwise finished to the exact dimensions and desired smooth surfaces, by ordinary and well known methods. The shaft when completed is shown in Fig. 2. From experience it has been determined that such a shaft is fully as strong as one made of a single piece and is substantially cheaper.

I have found in practice that even though a hole be bored and reamed and a ground surfaced plug be forced into it under heavy pressure that in the fusing operation in a hydrogen furnace copper will freely flow through such a joint. From this it follows that the shaft, cranks and pins may all be accurately and closely fitted to each other with the result that after the fusing operation they will all be united and accurately positioned and aligned one with respect to the other.

By reason of my improvement, it is possible to set the cranks in any desired angular relation one to the other without the necessity as at present, of making elaborate and costly forging or cutting the parts out of solid stock which latter is of course extremely costly and wasteful of material. Furthermore, the necessity of costly jigs and fixtures is largely avoided.

By first mounting the cranks on a straight, unbroken shaft 3 as shown in Fig. 1 a very rigid support is thus provided and one which permits of the parts being freely handled without danger of disturbing the alignment. This is particularly important in connection with the furnace operation. The amount of metal which has to be cut away between each pair of cranks is in reality relatively small. As before stated, the cranks are rather widely spaced in the drawing in the interest of clearness of illustration. For large production the saving in time due to the use of the unbroken shaft will much more than offset the cost of removing the shaft sections 6.

In accordance with the provisions of the patent statutes, I have described the principle of operation of my invention, together with the particular method which I now consider to represent the best manner for carrying it out, but I desire to have it understood that the particular method disclosed is only illustrative and that the invention may be carried out with such modifications as come within the scope of the appended claims.

What I claim as new and desire to secure by Letters Patent of the United States is:—

1. The method of forming crank shafts which comprises separately forming the shaft, crank and crank pin, said crank being provided with shaft and crank pin-receiving openings, inserting the shaft and pin in said openings and adjusting them to their final positions, and uniting the shaft, cranks and pin throughout the length of their contacting surfaces by the fusion of metal.

2. The method of forming crank shafts which comprises separately forming the shaft and cranks, each of the cranks having an opening of a size to receive the shaft and form a snug fit therewith, positioning said cranks with their connecting pins on the shaft and adjusting them to their final positions with respect to each other and to the shaft, uniting the shaft and cranks by the fusion of metal, and cutting away the portions of the shaft between the cranks and in line with the pin.

3. The method of forming crank shafts which comprises forming the shaft as a straight, unbroken member, separately forming the cranks and pins, each crank having a shaft and pin opening of a size to snugly fit the shaft and a pin, positioning the cranks with their pins on to the shaft and arranging the cranks in pairs in spaced relation to each other pair, uniting the parts by the fusion of metal, and cutting the portions of the shaft between each pair of cranks and in line with the crank pins.

4. The method of forming crank shafts which comprises forming the shaft as a straight, unbroken member, separately forming each crank with openings for the shaft and pins, heating the cranks and while in the heated condition positioning them on the shaft with their pins in place, uniting the separate parts by the fusion of metal, and cutting away the portions of the shaft adjacent the cranks and opposite the pins.

5. The method of forming crank shafts which comprises forming the shaft as a straight, unbroken member, separately forming each crank with openings for the shaft and its pin, shrinking the cranks on the shaft by mounting them when hot in a fixture and pushing the shaft by a longitudinal movement through the crank openings, uniting the shaft, cranks and pins by the fusion of metal, and cutting away the portions of the shaft between each pair of cranks and in line with their pins.

In witness whereof, I have hereunto set my hand this 19th day of November, 1923.

CHRISTIAN STEENSTRUP.